3,764,382

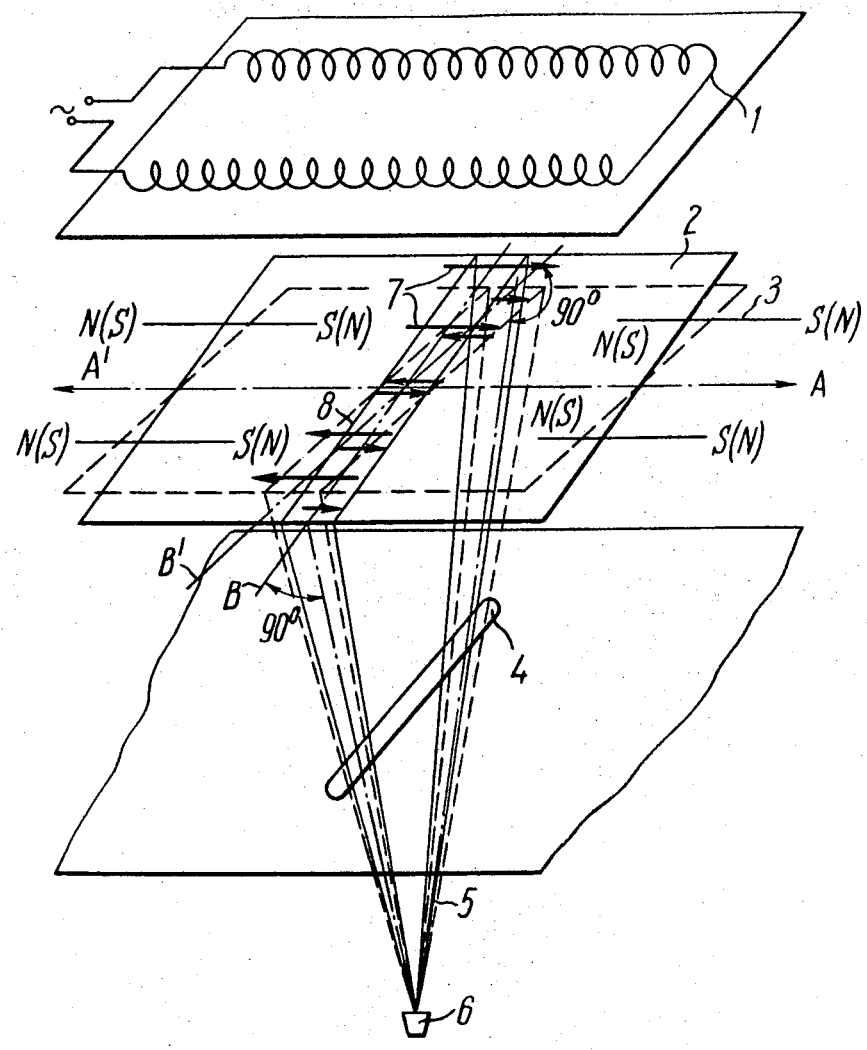

Patented Oct. 9, 1973

3,764,382
METHOD OF PRODUCING ANISOTROPIC MAGNETIC FILMS

Nikolai Anatolievich Danilov, Strategicheskoe shosse 39a, kv. 4, and Gennady Petrovich Zharikov, Petrovskaya ulitsa 5, kv. 12, both of Kiev, U.S.S.R.
Filed Jan. 14, 1970, Ser. No. 2,804
Int. Cl. H01f 10/00
U.S. Cl. 117—238                    2 Claims

ABSTRACT OF THE DISCLOSURE

A method of producing an anisotropic magnetic film by vacuum condensation at a temperature below 350° C. on a flat support which is moved in a magnetic field across a slotted diaphragm provided in a screen. The support moves above the diaphragm and above a magnetic alloy evaporator disposed under the diaphragm. A first coating of alloy vapors is condensed on the support by moving the support above the diaphragm in such a tilted position that the angle of incidence of a beam of evaporated atoms is perpendicular to one side edge of the support where after the support is tilted to a second position in which the angle of incidence of the beam of evaporated atoms in perpendicular to the other side edge of the support and the support again is moved above the diaphragm to apply a second alloy coating on the first coating to form a uniform anisotropic magnetic film over the whole area of the support.

---

The present invention relates to computing technique and, more particularly, the invention relates to methods of making anisotropic magnetic films for memory devices.

Known in the art is a method of producing anisotropic magnetic films by vacuum condensation on flat sheets moved in a magnetic field above a slotted diaphragm and, located under the diaphragm, an evaporator of a magnetic alloy with a small diameter of the evaporation area relative to the dimensions of the sheet.

The disadvantage of this method is that it does not provide for making of the films having a uniform anisotropy field. The nonuniformity of the anisotropy field is caused by the difference in the angle of incidence of the evaporated atoms on various sections of the sheets arranged along the slotted diaphragm. At an oblique angle of incidence anisotropy appears in the film whose field as a first approximation is proportional to the angle between the normal to the sheet surface and the direction of the beam of condensated atoms. This anisotropy is superposed on the anisotropy of the film induced by the magnetic field, thus causing different field anisotropy in various sections of the film.

Due to the difference in the distances from the evaporator to various sheet sections located along the slotted diaphragm and also due to different angles of incidence of the beam of condensated atoms directed to various sections of the sheet, the film has a nonuniform thickness.

When employing these films in memory devices, the nonuniformity of a uniaxial anisotropy field and the nonuniform thickness of the films result in scattering of the amplitudes of the signals read from the film elements. Since the value of the currents controlling the field elements is selected depending on the maximum current required for switching the field elements having a maximum anisotropy field, the reliability of storing information in the elements having anisotropy fields below the maximum value will be low due to a high ratio of the interference fields induced by the word drive currents in the adjacent word drive lines to the anisotropy field of these elements.

These disadvantages can be minimized by reducing the sheet width so as to decrease the divergence of the beam of atoms being condensated on this sheet. However, a reduced width of the sheet is also disadvantageous as it is associated with a low efficiency of the method determined by a number of the film elements condensated per-unit of time or per working cycle, whereas the construction of the modules of storages and their assembly are complicated.

An object of the present invention is to eliminate the above mentioned disadvantages.

The main object of the invention is to provide a method for producing anisotropic magnetic films by means of vacuum condensation on flat sheets, having a uniform anisotropy field, over the whole area of the sheets at the cost of changing the angle of incidence of a beam of evaporated atoms on each section of the sheet.

This object is accomplished by providing a method of making anisotropic magnetic films by means of vacuum condensation on a flat sheet moved in a magnetic field above a slotted diaphragm and an evaporator of a magnetic alloy having a small diameter of evaporation relative to the dimensions of the sheet, in which, according to the invention, during the condensation the beam of evaporated atoms is directed through the slotted diaphragm onto each section of the sheet at a variable angle and in the plane passing through the long geometrical axis of the diaphragm and through the center of the evaporation area, the above angle being varied by the value equal to the angle of divergence of the beam of the atoms condensated on the sheet along the slotted diaphragm.

It is expedient to direct the beam of evaporated atoms through the slotted diaphragm so that during the movement of the sheet in one direction across the slotted diaphragm it falls at a right angle to a portion of the sheet surface adjoining the lateral edge thereof, and during the movement in the other direction it falls on the opposite edge.

The film produced by the above-mentioned method features a uniform field of uniaxial anisotropy.

The proposed method provides for making a film having a uniform value of a uniaxial anisotropy field and a uniform thickness over the whole area of the sheet. High uniformity of the anisotropy field and the uniform thickness of the films increase their reliability during the operation in memory devices. The anisotropy field induced by a magnetic field during the condensation can be reduced uniformly throughout the whole area of the sheet, and this makes it possible to reduce the power consumed by the storage devices, to increase the operational speed and to reduce the overall dimensions, weight and cost of the memory devices employing magnetic films made according to the proposed method.

The proposed method, as compared with the method of condensation of an alloy being evaporated by means of at least two evaporators, is advantageous in that the thickness of the film being condensated is kept constant by controlling the rate of movement of the sheet without an accurate adjustment of the rate of evaporation and keeping it constant, which is impracticable at required high rates of evaporation.

The invention may best be understood by reference to the following description when taken in conjunction with the accompanying drawing the sole figure thereof showing a schematic diagram of the production of anisotropic magnetic films by means of vacuum condensation according to the proposed method.

As is shown in the drawing, a flat sheet 2 heated to a temperature of 200–300° C. by a heater 1 is moved along the lines of force 3 of a magnetic field across a slotted diaphragm 4 (shown in the drawing by the arrow A, A') through which a beam 5 of evaporated atoms is directed onto the sheet 2. An evaporator 6 of a magnetic alloy is located under the diaphragm 4 at a distance of 15–25 cm. from the sheet 2 so that the beam 5 of evaporated atoms falls on the sheet 2 at right angles. The diaphragm 4 limits the spread of the beam 5 of evaporated atoms in a direction transverse to its elongated geometrical axis (shown in the drawing by the arrows B and B'). It is well known that the axis of anisotropy appearing due to the oblique angle of incidence of the beam 5 onto the sheet 2 at low angles is perpendicular to the projection of the direction of the beam 5 of evaporated atoms on the plane of the sheet 2. Inasmuch as the angle of incidence in the direction of movement of the sheet is close to 90° the anisotropy of the oblique angle appears solely due to the deflection of the beam 5 of evaporated atoms from the normal to the sheet 2 in the direction along the slotted diaphragm 4. In this case the axis of anisotropy of the oblique angle coincides with the direction of the lines of force 3 of the applied magnetic field and, therefore, is parallel to the axis of anisotropy induced by this field over the whole area of the sheet 2.

The value of anisotropy of the oblique angle of incidence is increased together with an increase of the angle between the normal to the sheet and the direction of the beam 5 and the resulting anisotropy (arrows 7, 8) appearing due to the superposition of the anisotropy induced by the magnetic field on the anisotropy of the oblique angle of incidence on various sections of the sheet 2 located along the slotted diaphragm 4 is different.

If the beam of atoms falls at right angles to the central sections of the sheet, the resulting anisotropy is increased from the central portion of the film to the laterals edges of the sheet 2.

According to the proposed method, the sheet 2 is moved twice above the slotted diaphragm 4 through which the beam 5 of evaporated atoms passes to the sheet 2. During the first movement the sheet 2 is arranged relative to the evaporator 6 so that the beam 5 falls at right angles to the section of the sheet 2 adjacent its lateral edge and during the second movement the beam 5 falls at right angles to the other edge (in the drawing the position of the sheet 2 during the second movement is shown by dotted lines). The layers condensated during each movement of the sheet 2 are equal in thickness, and the sum of their thicknesses is equal to the required thickness of the film. The dependence of the anisotropy constant or of the anisotropy field appearing due to the oblique angle of incidence upon the angle between the normal and the beam 5 of atoms at comparatively low (within 10°) changes of the angle of incidence is almost linear. Therefore, the anisotropy of the layers is changed from one edge of the layer to the other edge, as $$H_{k_1} = H_k + h_k \cdot I = H_k + h_k \cdot \text{arc tg} \frac{x}{r} \cong H_k + h_k \frac{x}{r}$$

in one layer and $$H_{k_2} = H_k + h_k \cdot \text{arc tg} \frac{a-x}{r} \cong H_k + h_k \frac{a-x}{r}$$

in the other, where $H_k$ is the field of anisotropy induced by the external magnetic field during the condensation, $h_k$ is the increment of the anisotropy field of the oblique angle of incidence when increasing the angle between the normal to the surface and the direction of the beam of condensed atoms falling onto a section of the surface for 1°, $h_k\varphi$ is the anisotropy field of the oblique angle of incidence on the considered section of the layer, $\varphi$ is the angle between the normal to the sheet surface and the beam of atoms falling on the section of the sheet surface, $a$ is the sheet width, $r$ is the distance from the evaporator to the sheet, $x$ is the distance from the considered section of the layer to the lateral edge of the sheet. The distribution of the field of the resulting anisotropy of the layers $H_{k_1}$ and $H_{k_2}$ is shown by the different lengths of the arrows 7 and 8 in the first and second layers respectively.

The magnetic properties of the layers which are not separated by a nonmagnetic interlayer are averaged due to the exchangeable connection between the magnetizations of the layers. The anisotropy field of the double-layer films is determined by the expression $$H_{k_{1,2}} = \frac{H_{k_1} \cdot d_1 \cdot M_1 + H_{k_2} \cdot d_2 \cdot M_2}{d_1 \cdot M_1 + d_2 \cdot M_2}$$

where $d_1$, $d_2$ are thicknesses of the layers and $M_1$ and $M_2$ are their magnetizations. In this case $d_1 = d_2$, $M_1 = M_2$, therefore, the expression for the anisotropy field of the double-layer film is simplified to $$H_{k_{1,2}} = \frac{H_{k_1} + H_{k_2}}{2} = \left(H_k + h_k \cdot \frac{x}{r}\right) + \left(H_k + h_k \cdot \frac{a-x}{r}\right)$$
$$= H_k + \frac{h_k a}{2r} = \text{const.}$$

According to the obtained expression the anisotropy field in each section of the double-layer solid film or in each double-layer film on a common sheet is the same, i.e. does not depend on the location of the films and sections of the solid film.

In fact, on increasing the angle between the normal to the sheet 2 and the beam 5 of atoms falling on the sheet 2, the value $h_k$ is somewhat increased, i.e. the dependence of the anisotropy on the angle of incidence is linear only as a first approximation. When deducing the expression for the anisotropy field for a double-layer film, two more approximations have been made, namely that $$\text{arc tg} \frac{x}{r} = \frac{x}{r}$$

and that the thickness of each layer throughout the whole width of the layer 2 is constant. The thickness of each layer is maximum at the edge of the sheet 2, where the beam 5 of evaporated atoms is perpendicular to the surface of the sheet 2, and is minimum at the opposite edge of the sheet 2 where the anisotropy of the oblique angle is maximum. If none of the above-mentioned approximations is made, the anisotropy will also have a uniform value over the whole area of the sheet. The nonlinear dependence of the anisotropy of the oblique angle of the layers on the angle of incidence does not affect the uniformity of the resulting anisotropy because its effect is compensated by the nonlinear dependence of the coordinate of the section of the sheet 2 on the angle of incidence of the beam 5 of evaporated atoms on this section and by the reduced thickness of the layer on the sections where the anisotropy increases. The measurements of the anisotropy in the films produced according to the proposed method have confirmed these calculations.

In the described case when the lines 3 of force of the magnetic field are perpendicular to the slotted diaphragm, the anisotropy of the oblique angle of incidence is summed with the anisotropy induced by the magnetic field. The value of this anisotropy field is equal to the maximum value of the anisotropy field of the films made by means of the known method. Therefore, the use of the proposed films in memory devices instead of the films produced by the known method is not associated with an increase of the control currents, whereas the reliability of the film elements is increased due to a decrease of the scattering of the amplitudes of the read signals and widening of the limits of the control currents due to improved uniformity of the anisotropy.

The anisotropy of the oblique angle of incidence can be subtracted from the anisotropy induced by the magnetic field by directing the lines of force 3 of the magnetic field along the slotted diaphragm 4 and the axes of anisotropy of the oblique angle perpendicular to the anisotropy induced by the magnetic field. Due to a uniform decrease of the anisotropy, the currents required for controlling the film elements are reduced.

The value of the uniform-by-area anisotropy of the oblique angle of incidence of the films produced by the proposed method can be varied at the cost of an additional inclination of the plane of the film relative to the beam 5 of evaporated atoms.

The thickness of the produced films is more uniform than that of the films produced by the known method due to the fact that the condensation is effected at a variable distance between each section and the evaporator 6 and at a variable angle of incidence of the beam 5 on each section of the sheet 2. The improved uniformity of the thickness of the films makes it possible to improve the uniformity of the read signals and to increase the operational reliability of the film elements.

What is claimed is:

1. In a method of producing anisotropic magnetic films by vacuum condensation at temperatures below 350° C. on a flat support moving continuously and progressively in a magnetic field across a slotted diaphragm provided in a screen, the support moving above said diaphragm and above a magnetic alloy evaporator disposed under the diaphragm and having a smaller evaporation area with respect to the smaller axis of said slot of the diaphragm, an improvement comprising condensing alloy vapors on the support by moving the support above the diaphragm in such a position in which the angle of incidence of a beam of evaporated atoms measured in a plane passing through the long axis of said slotted diaphragm and the center of the evaporation area between the projection of a line normal to the support surface and the beam of vaporated atoms on said plane on the area adjoining the side edge of the support surface being coated with the alloy relative to the direction of support movement, is a minimum as compared with its value on other areas, then changing the position of the support so that the angle of incidence of the beam of evaporated atoms has the same minimum value on another area of the surface adjoining the opposite edge of the surface being coated with the alloy, and again moving the support above the diaphragm to apply a second alloy coating on the first to form a uniform anisotropic magnetic film over the whole area of the support.

2. A method as claimed in claim 1, wherein the beam of evaporated atoms is so directed through the slotted diaphragm that during one movement of the support it coincides with the normal line to the support surface on the support area adjoining one side edge of the support surface being coated, and during the other movement, it is directed towards the opposite edge and normal thereto.

References Cited

UNITED STATES PATENTS

| | | | |
|---|---|---|---|
| 3,253,945 | 5/1966 | Cauley et al. | 117—107.1 X |
| 3,525,638 | 8/1970 | Archey | 117—107.1 X |
| 3,263,648 | 8/1966 | Chapman et al. | 118—49.1 |
| 2,938,816 | 5/1960 | Günther | 118—49 X |
| 3,077,444 | 2/1963 | Hoh | 118—49 UX |
| 2,671,034 | 3/1954 | Steinfeld | 117—107.1 X |
| 3,141,791 | 7/1964 | Podolsky | 117—107.1 X |
| 2,900,282 | 8/1959 | Rubens | 117—238 X |
| 3,362,848 | 1/1968 | Hamilton | 117—107.1 X |

FOREIGN PATENTS

| | | | |
|---|---|---|---|
| 695,007 | 9/1964 | Canada | 117—238 |

OTHER REFERENCES

Smith: Thin Mag. Films, June 26, 1959, Electronics, pp. 44 and 45.

Takahashi, Journal of Applied Physics, supp. to vol. 33, No. 3, March 1962, pp. 1101–1106.

Roth: Chemical Abstracts, vol. 64, 1966, p. 13536e.

Snyder: IBM Tech. Dis. Bull., vol. 9, No. 7, December 1966.

WILLIAM D. MARTIN, Primary Examiner

B. D. PIANALTO, Assistant Examiner

U.S. Cl. X.R.

17—107.1, 107.2, 235, 240; 118—49.1